(12) United States Patent
Harley et al.

(10) Patent No.: US 9,774,394 B2
(45) Date of Patent: Sep. 26, 2017

(54) DIGITAL NOISE LOADING FOR OPTICAL RECEIVERS

(71) Applicant: Ciena Corporation, Hanover, MD (US)

(72) Inventors: James Harley, Nepean (CA); Jamie Gaudette, Richmond (CA); Lukas Jakober, Ottawa (CA); Elizabeth Rivera Hartling, Ottawa (CA); Bilal Riaz, Kanata (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 14/945,528

(22) Filed: Nov. 19, 2015

(65) Prior Publication Data

US 2016/0173198 A1 Jun. 16, 2016

Related U.S. Application Data

(63) Continuation of application No. 13/897,872, filed on May 20, 2013, now Pat. No. 9,225,430.

(51) Int. Cl.
| | | |
|---|---|---|
| *H04B 10/00* | (2013.01) | |
| *H04B 10/079* | (2013.01) | |
| *H04B 10/61* | (2013.01) | |

(52) U.S. Cl.
CPC ... *H04B 10/07953* (2013.01); *H04B 10/0799* (2013.01); *H04B 10/616* (2013.01)

(58) Field of Classification Search
CPC .................................................. H04B 10/616
See application file for complete search history.

(56) References Cited

U.S. PATENT DOCUMENTS

| | | | | |
|---|---|---|---|---|
| 4,056,788 A | * | 11/1977 | Brown | H03B 29/00 331/78 |
| 5,809,414 A | * | 9/1998 | Coverdale | H04B 17/23 455/403 |
| 6,091,716 A | * | 7/2000 | Gorday | H04B 7/18567 340/7.27 |
| 6,236,452 B1 | * | 5/2001 | Goto | G01M 11/30 356/73.1 |

(Continued)

OTHER PUBLICATIONS

"Characteristics of optically amplified optical fibre submarine cable systems", International Telecommunication Union, Apr. 2011, pp. 1-40.

*Primary Examiner* — Danny Leung
(74) *Attorney, Agent, or Firm* — Clements Bernard Walker PLLC; Christopher L. Bernard; Lawrence A. Baratta, Jr.

(57) ABSTRACT

Managing performance of an optical communications network may be facilitated by digital noise loading techniques. The digital noise loading techniques may include measuring a quality of a communication signal received at a coherent optical receiver, applying digital noise to the communication signal at the coherent optical receiver, and detecting a change in the quality of the communication signal at the coherent optical receiver in response to the application of the digital noise. Based on the change in the quality of the communication signal, an operating characteristic and/or a performance margin of the coherent optical receiver may be determined, prompting or facilitating further actions such as adjusting one or more operating parameters of the optical communications network and/or triggering an alert.

20 Claims, 3 Drawing Sheets

(56) References Cited

U.S. PATENT DOCUMENTS

| | | | | |
|---|---|---|---|---|
| 6,243,568 B1* | 6/2001 | Detlef | H04B 17/318 | 455/226.4 |
| 6,452,715 B1* | 9/2002 | Friedrich | H04B 10/0731 | 359/334 |
| 6,556,345 B1* | 4/2003 | Gassner | H01S 3/06754 | 359/337.11 |
| 7,561,797 B1* | 7/2009 | Harley | H04B 10/0793 | 398/159 |
| 2002/0044336 A1* | 4/2002 | Tanaka | H01S 3/2375 | 359/334 |
| 2002/0093729 A1* | 7/2002 | Gerish | H01S 3/06754 | 359/341.41 |
| 2007/0036084 A1* | 2/2007 | Lindsay | H04B 10/66 | 370/246 |
| 2010/0119242 A1* | 5/2010 | Hayashi | H04B 17/309 | 398/210 |
| 2011/0026940 A1* | 2/2011 | Komaki | H04B 10/60 | 398/202 |
| 2012/0237202 A1* | 9/2012 | Abe | H04B 10/616 | 398/16 |
| 2012/0328305 A1* | 12/2012 | Rahn | H04L 1/0047 | 398/202 |
| 2014/0269970 A1* | 9/2014 | Pratt | H04B 1/10 | 375/285 |
| 2014/0319354 A1* | 10/2014 | Chen | G01M 11/333 | 250/341.1 |
| 2014/0334831 A1* | 11/2014 | Kawazoe | H04B 10/693 | 398/210 |
| 2014/0341595 A1* | 11/2014 | Harley | H04B 10/616 | 398/208 |
| 2015/0192639 A1* | 7/2015 | Olgaard | G01R 31/3177 | 714/726 |
| 2016/0173198 A1* | 6/2016 | Harley | H04B 10/616 | 398/26 |
| 2016/0323091 A1* | 11/2016 | Inoue | H04L 27/38 | |

\* cited by examiner

DIGITAL NOISE LOADING FOR OPTICAL RECEIVERS

CROSS-REFERENCE TO RELATED APPLICATION(S)

The present patent/application is a continuation of the U.S. patent application Ser. No. 13/897,872, filed May 20, 2013, and entitled "DIGITAL NOISE LOADING FOR OPTICAL RECEIVERS," the contents of which are incorporated herein.

FIELD OF DISCLOSURE

This disclosure relates generally to telecommunications, and more particularly to coherent optical modems for optical communication systems and the like.

BACKGROUND

Optical communication systems are replacing other communication mediums due to several advantages over conventional systems. For example, optical communication systems typically provide wide bandwidth and low attenuation, immunity to electrical noise, and the ability to securely transmit signals over long distances, including transoceanic links. A typical coherent optical modem processes a received optical communication signal by mixing it with a local-oscillator (LO) signal and then processing the resulting mixed signals to determine the phase and amplitude of the communication signal in each time slot (symbol period), thereby recovering the encoded data. Coherent technology, powered by advanced Digital Signal Processing (DSP), provides access to a rich set of information on the optical field. Yet, for practical reasons, dynamic optimization of coherent modems remains elusive, especially for receivers installed in host environments that render servicing inconvenient if not impossible (e.g., the floor of the Atlantic Ocean).

Instead, modems are conventionally optimized only at initial deployment under start-of-life (SOL) conditions, such as in a laboratory or during network installation and commissioning. During such optimization procedures, various performance margins and operating characteristics, such as end-of-life (EOL) Quality factor (Q-factor or Q) or optical signal-to-noise ratio (OSNR) margin, can be measured and optimized through conventional optical noise loading experiments. On an in-service cable system, however, this approach can disrupt traffic bearing channels and may unacceptably degrade network operation as a whole. This procedure is also inherently prone to error and is becoming more difficult as advances in digital coherent technology allow for improved spectral efficiency and dual-polarization modulation, such that noise floors can no longer be measured.

Current practices in performance budgeting as well as system acceptance are therefore unable to take advantage of the real-world, dynamic set of performance measures offered by coherent technology, despite the inherent limitations and continually diminishing effectiveness of current optimization procedures. For example, network aging and repair activities tend to degrade performance over time. Changes in the environment where the modem is installed may, from time to time, also affect performance. Current practices either ignore these effects or overcompensate for them with overly cautious performance margins. More often, the latter is chosen, with negative impact on system cost.

Accordingly, there is in general a need for more effective techniques for dynamic optimization of optical modem performance, and in particular, for techniques to directly measure various operating characteristics and available performance margins without having to resort to conventional optical noise loading.

SUMMARY

Example embodiments of the invention are directed to systems and methods for managing performance of an optical communications network.

In some embodiments, an apparatus is provided for managing performance of the optical communications network. The apparatus may comprise, for example: logic configured to measure a quality of a communication signal received at a coherent optical receiver in the optical communications network; logic configured to apply digital noise to the communication signal at the coherent optical receiver; logic configured to detect a change in the quality of the communication signal at the coherent optical receiver in response to the application of the digital noise; and logic configured to determine an operating characteristic and/or a performance margin of the coherent optical receiver based on the change in the quality of the communication signal.

In other embodiments, a method is provided for managing performance of the optical communications network. The method may comprise, for example: measuring a quality of a communication signal received at a coherent optical receiver in the optical communications network; applying digital noise to the communication signal at the coherent optical receiver; detecting a change in the quality of the communication signal at the coherent optical receiver in response to the application of the digital noise; and determining an operating characteristic and/or a performance margin of the coherent optical receiver based on the change in the quality of the communication signal.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Aspects of the invention are disclosed in the following description and related drawings directed to specific embodiments of the invention. The term "embodiments of the invention" does not require that all embodiments of the invention include the discussed feature, advantage, or mode of operation, and alternate embodiments may be devised without departing from the scope of the invention. Additionally, well-known elements of the invention may not be described in detail or may be omitted so as not to obscure more relevant details of the invention.

The terminology used herein is for the purpose of describing particular embodiments only and is not intended to be limiting of all embodiments of the invention. As used herein, the singular forms "a," "an," and "the" are intended to include the plural forms as well, unless the context clearly indicates otherwise. It will be further understood that the terms "comprise," "comprising," "include," and/or "including," when used herein, specify the presence of stated features, integers, steps, operations, elements, and/or components, but do not preclude the presence or addition of one or more other features, integers, steps, operations, elements, components, and/or groups thereof.

Figure 1:
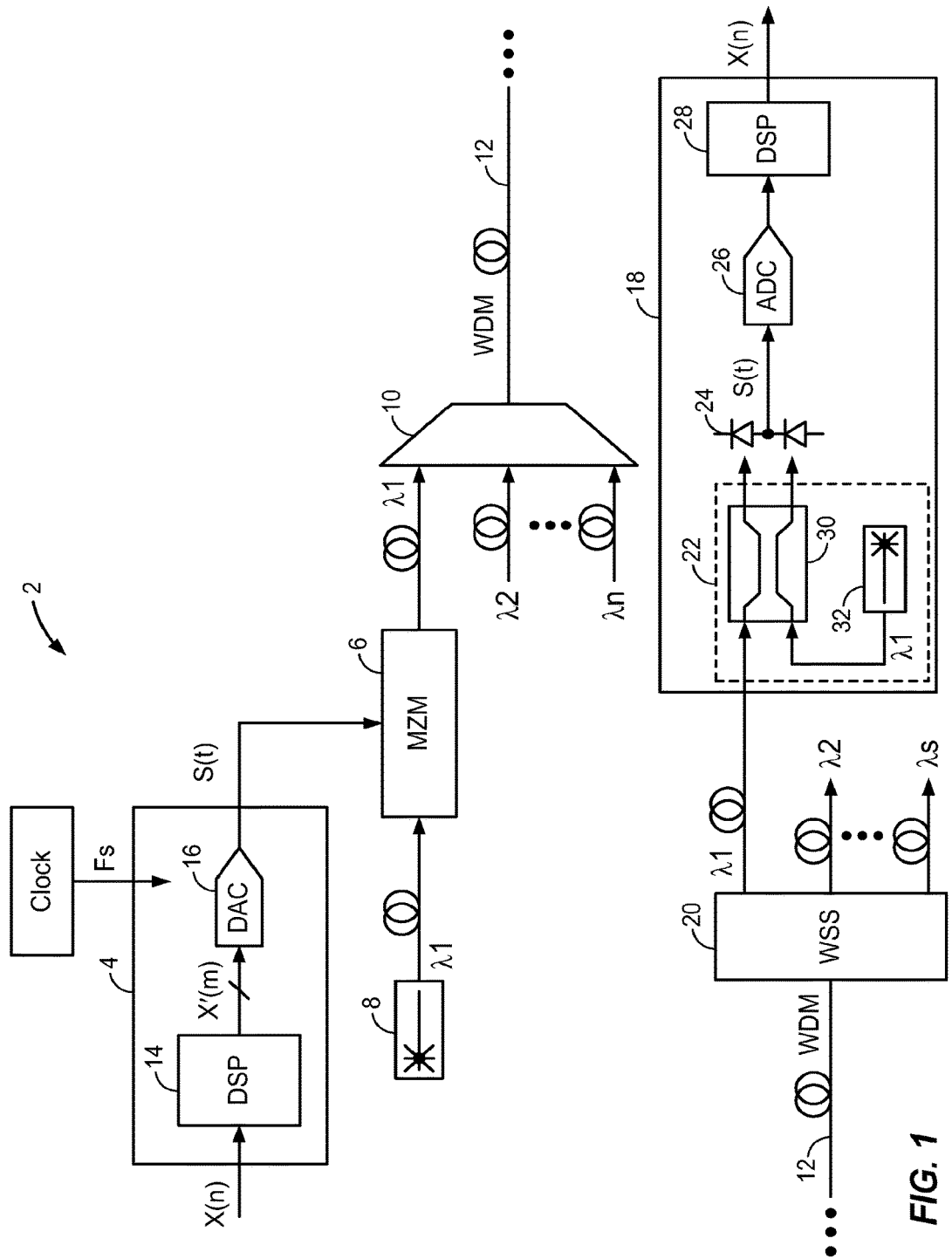
FIG. 1 illustrates an example optical communications system that may be employed according to various embodiments.

FIG. 1 illustrates an example optical communications system that may be employed according to various embodiments. As shown, the optical communications system generally includes a transmitter modem 2 and a receiver modem 18 coupled together by an optical fiber link 12.

The transmitter modem 2 typically comprises a signal generator 4 for converting a digital signal X(n) to be transmitted into a drive signal S(t) which drives a modulator 6 (e.g., a Mach-Zehnder Modulator (MZM)). The modulator 6 modulates a narrow-band optical carrier, generated by a laser 8 tuned to a predetermined center wavelength $\lambda 1$ (among other center wavelengths $\lambda 2$ to $\lambda n$), to generate a corresponding optical channel signal. The resultant signal may then be multiplexed by a conventional MUX 10 into a Wavelength Division Multiplexed (WDM) signal for transmission through the optical fiber link 12 to the receiver modem 18. Typically, the drive signal S(t) is a radio frequency (RF) analog electrical signal. In such cases, the signal generator 4 may include a Digital Signal Processor (DSP) 14 cascaded with a Digital-to-Analog Converter (DAC) 16. The DSP 14 operates to process the digital signal X(n) to generate a corresponding digital drive signal X'(m), which is designed in accordance with the performance and operating requirements of the DAC 16. The DAC 16 operates in a conventional manner to convert the digital drive signal X'(m) into the required analog RF drive signal S(t) for modulation onto the optical carrier.

The optical channel signal can be demultiplexed and routed through the optical communications network using filter based DeMUX devices or Wavelength Selective Switches (WSSs) known in the art. For illustration purposes, the receiver modem 18 is shown as coupled to a drop port of a WSS 20, which operates in a conventional manner to couple the channel signal from of an inbound WDM signal to the receiver modem 18.

The receiver modem 18 comprises an optical front end 22 for supplying the optical channel signal to a photodetector block 24, which operates in a conventional manner to detect the incoming optical channel signal and generate an electrical photodetector current containing spectral components corresponding to the high-speed signal S(t). The photodetector current is then sampled by an Analog-to-Digital Converter (ADC) 26 and processed by a corresponding DSP 28 in the receiver modem 18 using various digital signal processing techniques to recover the original digital signal X(n). In the design of FIG. 1, the optical front end 22 is provided by a mixer 30, which combines the incoming optical channel signal with a narrow-band light generated by a local laser 32 tuned to the center wavelength $\lambda 1$ of the optical channel signal. This arrangement may be used to enable coherent detection of the optical channel signal. However, other arrangements, such as well known direct detection techniques, may also be used.

As noted in the background above, coherent detection has the potential to provide access to a rich set of information on the optical field. Despite this, current practices in performance budgeting and system acceptance focus only on the start-of-life (SOL) pre-forward-error-correction (pre-FEC) bit error ratio, translated to $dBQ^2$, or alternatively SOL optical signal-to-noise ratio (OSNR) and ignore the set of measures offered by coherent technology. This is largely because conventional techniques for optical modem characterization, end-of-life (EOL) performance prediction, and performance margin measurement rely heavily on optical noise loading, which is a timely and expensive process, requiring specialized skills and equipment, and is impractical at best. By contrast, devices, components, methods, and other techniques are provided herein that facilitate modem characterization using digital noise loading to derive performance budgets and perform other operations.

Figure 2:
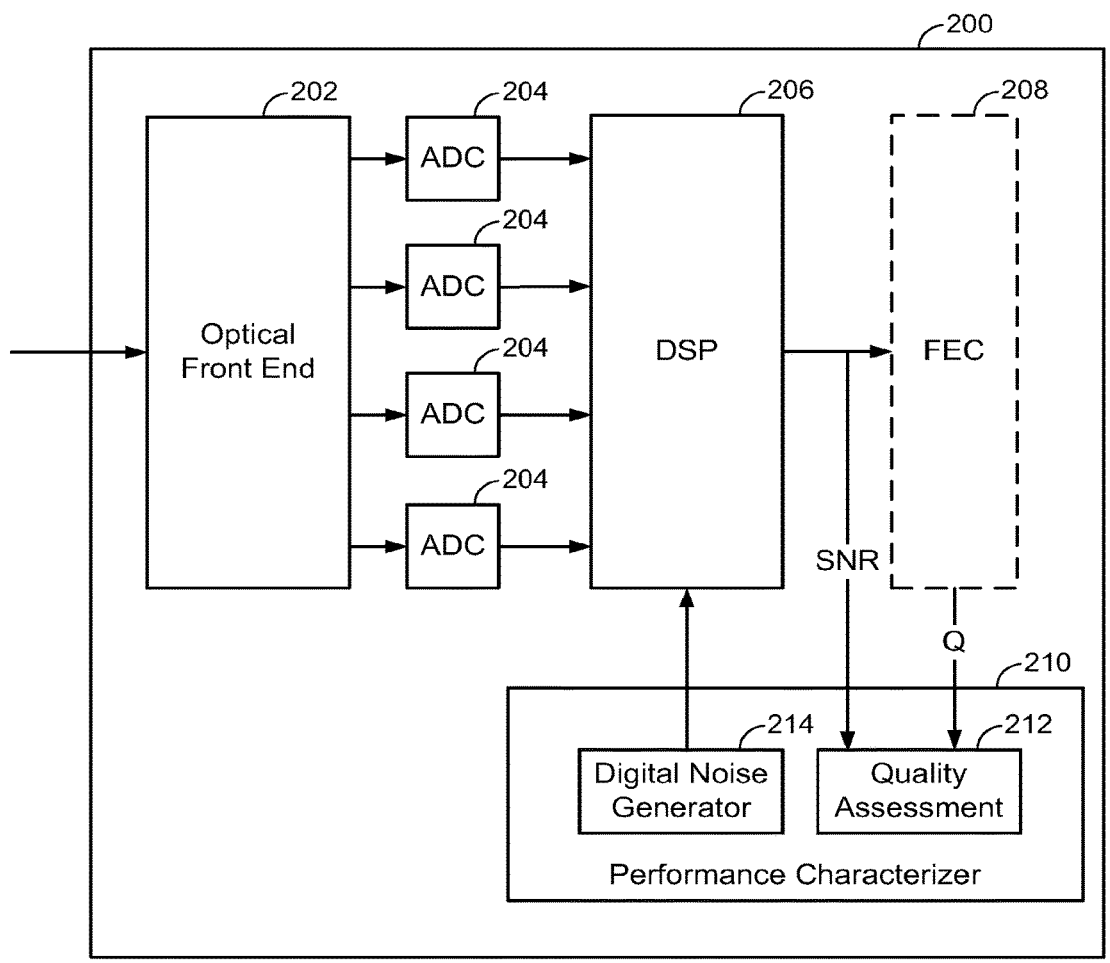
FIG. 2 illustrates an example coherent optical receiver modem configured for digital noise loading according to various embodiments.

FIG. 2 illustrates an example coherent optical receiver modem configured for digital noise loading according to various embodiments. For illustration purposes, the coherent optical receiver 200 is shown as generally including optical front end circuitry 202, one or more ADCs 204, and a DSP 206, the operations of which are described above in connection with FIG. 1. It will be appreciated that the coherent optical receiver 200 may also include other components known in the art, such as the optionally illustrated Forward Error Correction (FEC) unit 208 and so on. Here, the coherent optical receiver 200 also includes a built-in performance characterizer 210 configured to manage performance of the coherent optical receiver 200. In the design of FIG. 2, the performance characterizer 210 includes a quality assessment unit 212 and a digital noise generator 214.

The quality assessment unit 212 is configured to provide a signal quality measure for a communication signal received at the coherent optical receiver 200. The signal quality measure may be, for example, an electrical Signal-to-Noise Ratio (SNR) measurement or a Quality factor (Q factor or Q) measurement of the communication signal. As shown, the SNR is generally measured before further processing by the FEC unit 208, for example, while Q (or $Q^2$) is generally measured after further processing by the FEC unit 208. FEC processing is commonly provided in coherent optical modems and other types of telecommunications equipment to reduce errors in data being transmitted over a communications link without requiring retransmission of data. SNR and Q measurements provide two distinct although related measures of quality to assess the viability of a given communication signal.

Returning to FIG. 2, the digital noise generator 214 is configured to apply digital noise to the communication signal to facilitate receiver characterization. As shown, in contrast to conventional optical noise loading techniques, the digital noise generator 214 may apply the digital noise to the coherent optical receiver 200 directly, such as via processing performed at the DSP 206. This is advantageous over systems that rely on optical noise loading or even digital noise loading at the transmitter, which distorts the transmitted signal waveform and changes its interaction with the propagation medium, thereby changing the nonlinear propagation penalty.

Examples of the digital noise generator 214 include digital error filters that can be applied on the digital data path to generate noise from the digital signal itself (which can be implemented using an existing number of logic gates) as well as dedicated digital noise generators (which may require additional gates). In one design, the digital noise generator 214 may use one or a combination of filters to add white Gaussian noise to the communication signal at the coherent optical receiver 200, causing a deterministic reduction in signal quality of the communication signal as processed by the DSP 206. The white Gaussian noise may be applied as independent Gaussian random variables for each sample, with the independence being maintained across both adjacent time samples and across each of the ADC channels. In other embodiments, the noise added may be non-white and/or non-Gaussian if desired, and may include asymmetric radial and angular components. For example, a correlation may be added to the Gaussian random variables and controlled across the time samples and across each of the ADC channels (i.e., "colored" noise). As another example, a different amplitude probability density function other than Gaussian may be used (e.g., Maxwellian). The amount of noise applied may be preset or dictated by a remote operator, such as a system technician or designer.

When used in combination, the different filters may serve different or complimentary functions. For example, the DSP 206 may contain two sets of filters, static and dynamic. For digital noise generators, the generated noise may be added to the signal by augmenting it on to the static filter in the DSP 206. This noise may be made dependent on the filter coefficients, and accordingly, distributed such that its effect on the signal does not change with varying filter coefficients. Furthermore, depending on the structure of the static filter, the noise may be added in a manner so that the dynamic filter in the DSP 206 does not compensate for it.

The quality assessment unit 212 is then further configured to detect a change in the quality of the communication signal at the coherent optical receiver 200 in response to the application of the digital noise. Based on the change in signal quality, the performance characterizer 210 may be configured to determine a performance margin and/or an operating characteristic of the coherent optical receiver 200, for example, which provides more real-world, real-time operating information than optical noise loading experiments and which may be used for a variety of equipment monitoring and management functions. In some embodiments, the operating characteristic may include values for different performance measures at a given operating point of the coherent optical receiver 200. A relationship between the two performance measures may accordingly be derived based on the change in the quality of the communication signal and a level of the digital noise applied. For example, the quality assessment unit 212 may be configured to measure the electrical SNR and/or Q factor of the communication signal before and after application of the digital noise, and the resultant degradation may be used to determine a relationship between the SNR and Q performance measures (e.g., the dependence of Q on SNR). The relationship between the SNR and Q performance measures can be used to extract performance margins for either measure (e.g., based on a failure point defined for the other), or for other performance measures by converting based on a known relationship. Such performance margins generally represent the difference between a current operating condition and a failure condition for processing the communication signal.

In other embodiments, performance margins may be measured directly by the performance characterizer 210 based on the change in signal quality. For example, the digital noise generator 214 may apply digital noise to the communication signal in sufficient magnitude to cause a failure condition (e.g., FEC failure at the FEC unit 208) in decoding or otherwise processing the communication signal. The quality assessment unit 212 may then determine the signal quality degradation at the point of failure, with the magnitude of the degradation to failure directly indicating the performance margin for that performance measure. As noted above, for performance measures that may not be directly measurable at the coherent optical receiver 200, performance margins may still be determined based on a known relationship with other values. For example, Q factor is a function of electrical SNR and OSNR is a deterministic component of the electrical SNR. Therefore, lowering the electrical SNR has an equivalent impact on performance as lowering the system OSNR. The electrical SNR may be lowered to FEC failure, and the SNR margin may be measured. The SNR margin may then be converted to an OSNR margin based on the dependence of SNR on OSNR.

It will be appreciated that once performance measures of the coherent optical receiver 200 have been determined according to the digital noise loading techniques herein, various methods for system characterization known in the art (e.g., those used for optical noise loading based characterizations) may be similarly employed or adapted to systems with digital noise loading capabilities. For example, the Q to OSNR relationship may be used to extract other components of the electrical SNR, including modem and propagation components. As another example, a Power Budget Table (PBT) may be constructed, in accordance with the International Telecommunication Union (ITU) specification G.977 or other requirements. However, such system characterization procedures may be more effectively automated and practiced in real-world, real-time environments when employed or adapted to the systems with digital noise loading capabilities facilitated herein. Further, the dynamic performance measures and system characterizations may be used to adjust one or more operating parameters of the optical communications network (e.g., transmission power, data rates), trigger one or more alerts (e.g., service calls, equipment replacements), etc., based on the determined performance margins and/or operating characteristics, functionality that has been heretofore impractical at best.

Figure 3:
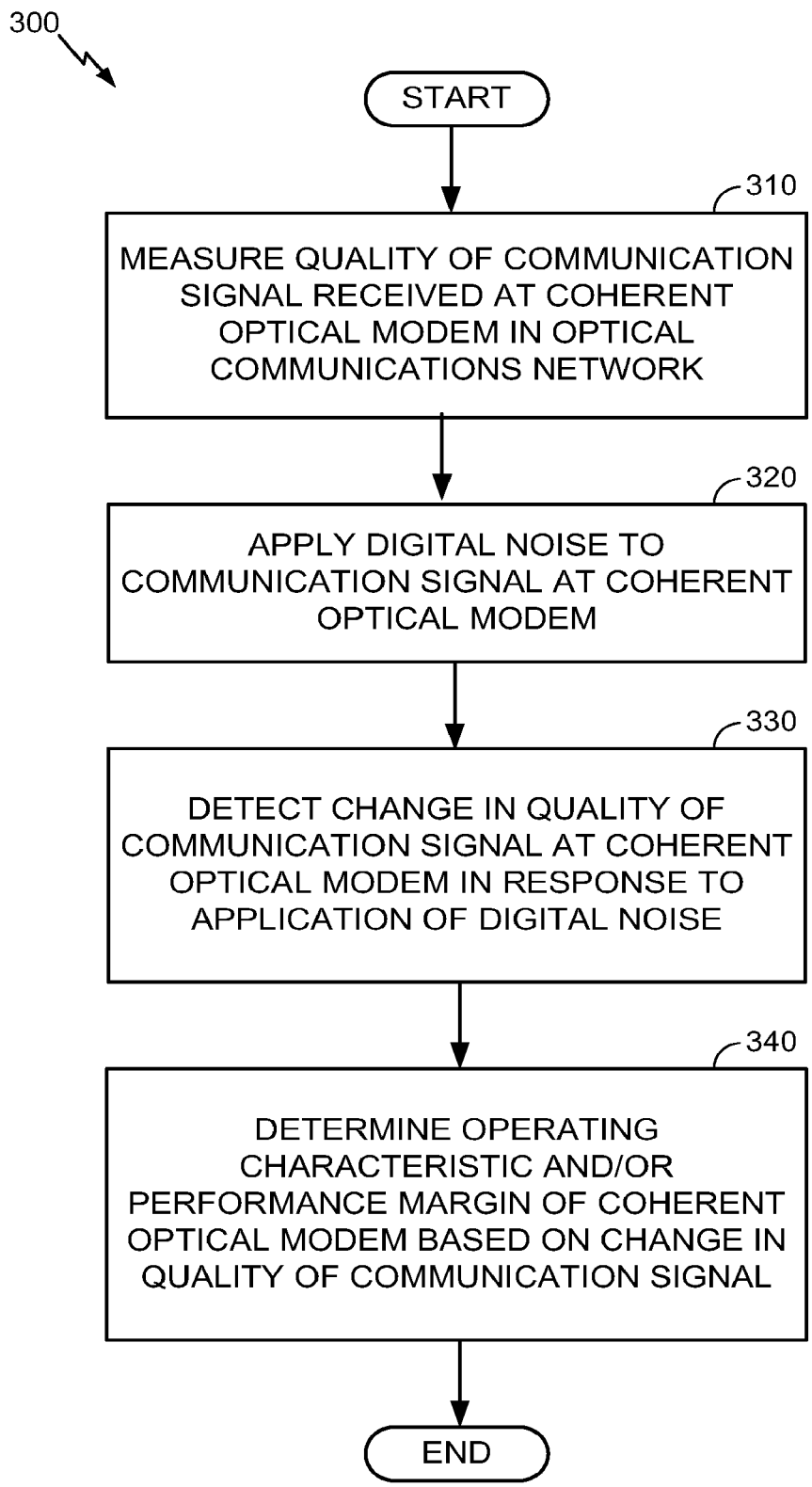
FIG. 3 is a flow diagram illustrating an example method for managing performance of an optical communications network according to various embodiments.

FIG. 3 is a flow diagram illustrating an example method for managing performance of an optical communications network according to various embodiments. As shown, the method 300 includes measuring a quality of a communication signal received at a coherent optical receiver modem in the optical communications network (block 310), such as the coherent optical receiver 200 described above with reference to FIG. 2. Digital noise may then be applied to the communication signal at the coherent optical receiver (block 320), and a change in the quality of the communication signal at the coherent optical receiver may be detected in response to the application of the digital noise (block 330). Based on the change in the quality of the communication signal, an operating characteristic and/or a performance margin of the coherent optical receiver may be determined in accordance with various embodiments (block 340).

As discussed in more detail above, in certain embodiments, the applied digital noise may be substantially Gaussian or white noise and may be applied to the communication signal via a filter at a digital signal processor (e.g., the DSP 206) of the coherent optical receiver. The quality of the communication signal may correspond to a quality factor or a signal-to-noise ratio. The operating characteristic may comprise values for two performance measures at a given operating point of the coherent optical receiver, for example, and the method may further comprise determining a relationship between the two performance measures based on the change in the quality of the communication signal and a level of the digital noise applied. The performance margin may be a quality factor margin or a signal-to-noise ratio margin, for example, representing the difference between a current operating condition and a failure condition for processing the communication signal.

As also discussed in more detail above, in some embodiments, determining the operating characteristic and/or the performance margin may comprise determining a first performance margin for a first performance measure of the coherent optical receiver and converting the first performance margin into a second performance margin for a second performance measure of the coherent optical receiver (e.g., based on a known relationship between the first and second performance measures). For direct margin determinations, the digital noise may be applied up to a failure condition for processing the communication signal, with the performance margin being determined based on a magnitude of the change upon meeting the failure condition. In still further embodiments, the method may further comprise adjusting one or more operating parameters of the optical communications network and/or triggering an alert based on the determined performance margin and/or operating characteristic.

Those of skill will appreciate that the various illustrative components, logical blocks, modules, circuits, and/or algorithm steps described in connection with the examples disclosed herein may be implemented as electronic hardware, firmware, computer software, or combinations thereof. To clearly illustrate this interchangeability of hardware, firmware and software, various illustrative components, blocks, modules, circuits, and/or algorithm steps have been described above generally in terms of their functionality. Whether such functionality is implemented as hardware, firmware or software depends upon the particular application and design constraints imposed on the overall system. Skilled artisans may implement the described functionality in varying ways for each particular application, but such implementation decisions should not be interpreted as causing a departure from the scope or spirit of the present disclosure.

For example, for a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described therein, or a combination thereof. With software, the implementation may be through modules (e.g., procedures, functions, etc.) that perform the functions described therein. The software codes may be stored in memory units and executed by a processor unit.

Additionally, the various illustrative flow diagrams, logical blocks, modules and/or algorithm steps described herein may also be coded as computer-readable instructions carried on any computer-readable medium known in the art or implemented in any computer program product known in the art. Computer-readable media include both computer storage media and communication media including any medium that facilitates transfer of a computer program from one place to another. A storage medium may be any available medium that can be accessed by a computer. By way of example, and not limitation, such computer-readable media may include RAM, ROM, EEPROM, CD-ROM or other optical disc storage, magnetic disk storage or other magnetic storage devices, or any other medium that can be used to carry or store desired program code in the form of instructions or data structures and that can be accessed by a computer.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of a medium. Disk and disc, as used herein, include compact disc (CD), laser disc, optical disc, digital versatile disc (DVD), floppy disk and blu-ray disc, where disks usually reproduce data magnetically, and discs reproduce data optically with lasers. Combinations of the above should also be included within the scope of computer-readable media.

The forgoing description is provided to enable any person skilled in the art to make or use embodiments of the present invention. It will be appreciated, however, that the present invention is not limited to the particular formulations, process steps, and materials disclosed herein, as various modifications to these embodiments will be readily apparent to those skilled in the art. That is, the generic principles defined herein may be applied to other embodiments without departing from the spirit or scope of the invention.

The invention claimed is:

1. A method of characterizing a receiver, the method comprising:
   assessing at least one signal quality measure of a communication signal received by the receiver;
   causing application of digital noise to the communication signal at the receiver via processing performed by a digital signal processor to create the digital noise, wherein the digital signal processor is configured to perform detection of the communication signal in conjunction with an optical front end; and
   assessing a change in the at least one signal quality measure caused by the application of the digital noise.

2. The method of claim 1, further comprising:
   determining at least one of an operating characteristic and a performance margin for the at least one signal quality measure based on the assessed changes.

3. The method of claim 1, wherein an amount of the digital noise is determined by an operator.

4. The method of claim 1, further comprising:
   determining a relationship between two signal quality measures based on associated changes in the two signal quality measures caused by the application of the digital noise.

5. The method of claim 4, further comprising:
   determining a margin for one of the two signal quality measures based on a measured margin for another of the two signal quality measures and the determined relationship between the two signal quality measures.

6. The method of claim 1, further comprising:
   adjusting one or more operating parameters of an optical communications network associated with the communication signal based on a change in the at least one signal quality measure.

7. The method of claim 1, further comprising:
   triggering one or more alerts based on the determined one or more operating characteristics.

8. A performance characterizer apparatus for characterizing a receiver, the performance characterizer apparatus comprising:
   circuitry configured to assess at least one signal quality measure of a communication signal received by the receiver;

circuitry configured to cause application of digital noise to the communication signal at the receiver via processing performed by a digital signal processor to create the digital noise, wherein the digital signal processor is configured to perform detection of the communication signal in conjunction with an optical front end; and circuitry configured to assess a change in the at least one signal quality measure caused by the application of the digital noise.

9. The performance characterizer apparatus of claim 8, further comprising:
circuitry configured to determine at least one of an operating characteristic and a performance margin for the at least one signal quality measure based on the assessed changes.

10. The performance characterizer apparatus of claim 8, wherein an amount of the digital noise is determined by an operator.

11. The performance characterizer apparatus of claim 8, further comprising:
circuitry configured to determine a relationship between two signal quality measures based on associated changes in the two signal quality measures caused by the application of the digital noise.

12. The performance characterizer apparatus of claim 11, further comprising:
circuitry configured to determine a margin for one of the two signal quality measures based on a measured margin for another of the two signal quality measures and the determined relationship between the two signal quality measures.

13. The performance characterizer apparatus of claim 8, further comprising:
circuitry configured to adjust one or more operating parameters of an optical communications network associated with the communication signal based on a change in the at least one signal quality measure.

14. The performance characterizer apparatus of claim 8, further comprising:
circuitry configured to trigger one or more alerts based on the determined one or more operating characteristics.

15. A receiver configured to provide digital noise loading for characterization, the receiver comprising:
a digital signal processor configured to receive digital signals, wherein the digital signals collectively form a communication signal; and
a performance characterizer configured to
assess at least one signal quality measure of a communication signal received by the receiver,
cause application of digital noise to the communication signal at the receiver via processing performed by the digital signal processor to create the digital noise, wherein the digital signal processor is configured to perform detection of the communication signal in conjunction with an optical front end, and
assess a change in the at least one signal quality measure caused by the application of the digital noise.

16. The receiver of claim 15, wherein the performance characterizer is further configured to determine at least one of an operating characteristic and a performance margin for the at least one signal quality measure based on the assessed changes.

17. The receiver of claim 15, wherein an amount of the digital noise is determined by an operator.

18. The receiver of claim 15, wherein the performance characterizer is further configured to determine a relationship between two signal quality measures based on associated changes in the two signal quality measures caused by the application of the digital noise.

19. The receiver of claim 15, wherein the performance characterizer is further configured to cause adjustment of one or more operating parameters of an optical communications network associated with the communication signal based on a change in the at least one signal quality measure.

20. The receiver of claim 15, wherein the performance characterizer is further configured to trigger one or more alerts based on the determined one or more operating characteristics.

* * * * *